(12) United States Patent
Sease

(10) Patent No.: US 7,425,012 B1
(45) Date of Patent: Sep. 16, 2008

(54) JACK STAND ASSEMBLY FOR BOAT TRAILERS

(76) Inventor: Andrew E. Sease, 831 First Street SE., Hartley, IA (US) 51346

( * ) Notice: Subject to any disclaimer, the term of this patent is extended or adjusted under 35 U.S.C. 154(b) by 318 days.

(21) Appl. No.: 11/299,718

(22) Filed: Dec. 12, 2005

(51) Int. Cl.
*B60D 1/66* (2006.01)
(52) U.S. Cl. ............... 280/475; 280/763.1; 280/767
(58) Field of Classification Search ............ 280/475, 280/763.1, 767
See application file for complete search history.

(56) References Cited

U.S. PATENT DOCUMENTS

| | | | |
|---|---|---|---|
| 3,944,259 A * | 3/1976 | Miller | 280/475 |
| 5,040,937 A | 8/1991 | Godbersen | |
| 5,152,657 A | 10/1992 | Kehne | |
| 5,503,423 A | 4/1996 | Roberts et al. | |
| 5,992,871 A | 11/1999 | Rowland et al. | |
| 6,135,685 A | 10/2000 | Anthony et al. | |
| 6,302,301 B1 * | 10/2001 | Vette | 222/142.6 |
| 2006/0043695 A1 * | 3/2006 | Wilson, Jr. | 280/475 |

* cited by examiner

*Primary Examiner*—Tony Winner
*Assistant Examiner*—Marlon A Arce Diaz
(74) *Attorney, Agent, or Firm*—McKee, Voorhees & Sease, P.L.C.

(57) ABSTRACT

A trailer with an improved jack stand to selectively allow the stand to rest on the ground with either a foot pedestal or a ground engaging roller.

6 Claims, 5 Drawing Sheets

JACK STAND ASSEMBLY FOR BOAT TRAILERS

FIELD OF THE INVENTION

The present invention relates to trailers in general and boat trailers in particular. In particular, it relates to an improved wheeled trailer with a winch and jack stand on the tongue area. The jack stand allows selective use of a foot pedestal or a roller wheel at the choice of the operator.

BACKGROUND OF THE INVENTION

Recreational boating, being an ever increasing sport in popularity, there is an increasing need for effective and easy to handle boat trailers for transporting boats from storage location to use area. In winter months, boats are typically stored on such trailers and during the summer months, if the boat is in use, the trailer must be stored in a safe and convenient area in a secure fashion to prevent it from unwanted movement. Most boat trailers have a jack stand mounted at the front for supporting the trailer in a position substantially level with the ground when a trailer is standing alone.

A typical jack stand has a telescoping rod with a roller wheel mounted at the bottom which may be rotated from a transport position parallel to the trailer tongue to a ground engaging position where the roller wheel is on the ground.

While boat trailers are described specifically, the utility is for all trailers currently using a trailer jack bulldog system. Currently owners must choose between a foot pedestal "shoed" bulldog jack or a "wheeled" bulldog jack. Both the "shoed" and "wheeled" jack system have specific advantages and disadvantages when stored. Many owners like the advantage of a "wheeled" jack for convenience of moving a trailer on level or cement surfaces when not hitched to a vehicle. However, the same trailer may be stored or unhitched from a vehicle at various times and locations. For example, the same trailer may be unhooked on soft soils or sandy soils at which time a foot pedestal would be desirable to prevent the settling of the jack in the soils, thereby making it difficult or impossible to rehitch the trailer to the tow vehicle due to insufficient height of the jack. Additionally, on uneven or unlevel surfaces there may be a tendency for the trailer tongue or entire trailer to move from a desired parked position. Under these circumstances a "shoed" foot pedestal would be most advantageous, if available.

It is the primary object of this invention to fulfill this currently unfulfilled need in allowing a trailer owner the option of selecting the appropriate jack end to accommodate the particular circumstances, terrain, and mobility needs of the trailer.

When the roller wheel is on the ground, the trailer can be easily rolled because of the tripod of wheels formed by the trailer wheels hooked to the axle unit and the jack stand pedestal roller wheel. This is convenient for movement but creates some risk during storage, i.e., that the trailer would simply roll away. This necessitates locking of trailer wheels and/or storage with the jack stand in transport positioned and the trailer hitch either on the ground or supported by something like a series of cement blocks. Either way, inconvenience results. If the hitch is put on the ground, there is potential for damage caused by the ground surface to the socket. If it is stored, for example, using a series of cement blocks to hold the tongue in position parallel above the ground, such offers the inconvenience of having to keep a series of cement blocks and, if the blocks happen to be knocked over, the trailer will fall causing damage risk.

It can be seen, therefore, there is a continuing need for an improvement of boat trailers to allow the trailer, on the one hand, to have a jack stand but, on the other hand, to have a jack stand which not only allows for a ground engaging roller wheel but also selectively for a ground engaging foot pedestal to secure it in an immoveable position. To date, no such trailer has been provided.

It is a primary object of this invention to fulfill this currently unfulfilled need for boat trailers specifically, but also others. Other objects as well will be apparent from the description provided below.

BRIEF SUMMARY OF THE INVENTION

A boat trailer with an improved jack stand to selectively allow the stand to rest on the ground with either a foot pedestal or a ground engaging roller.

DETAILED DESCRIPTION OF THE PREFERRED EMBODIMENT

Figure 1:
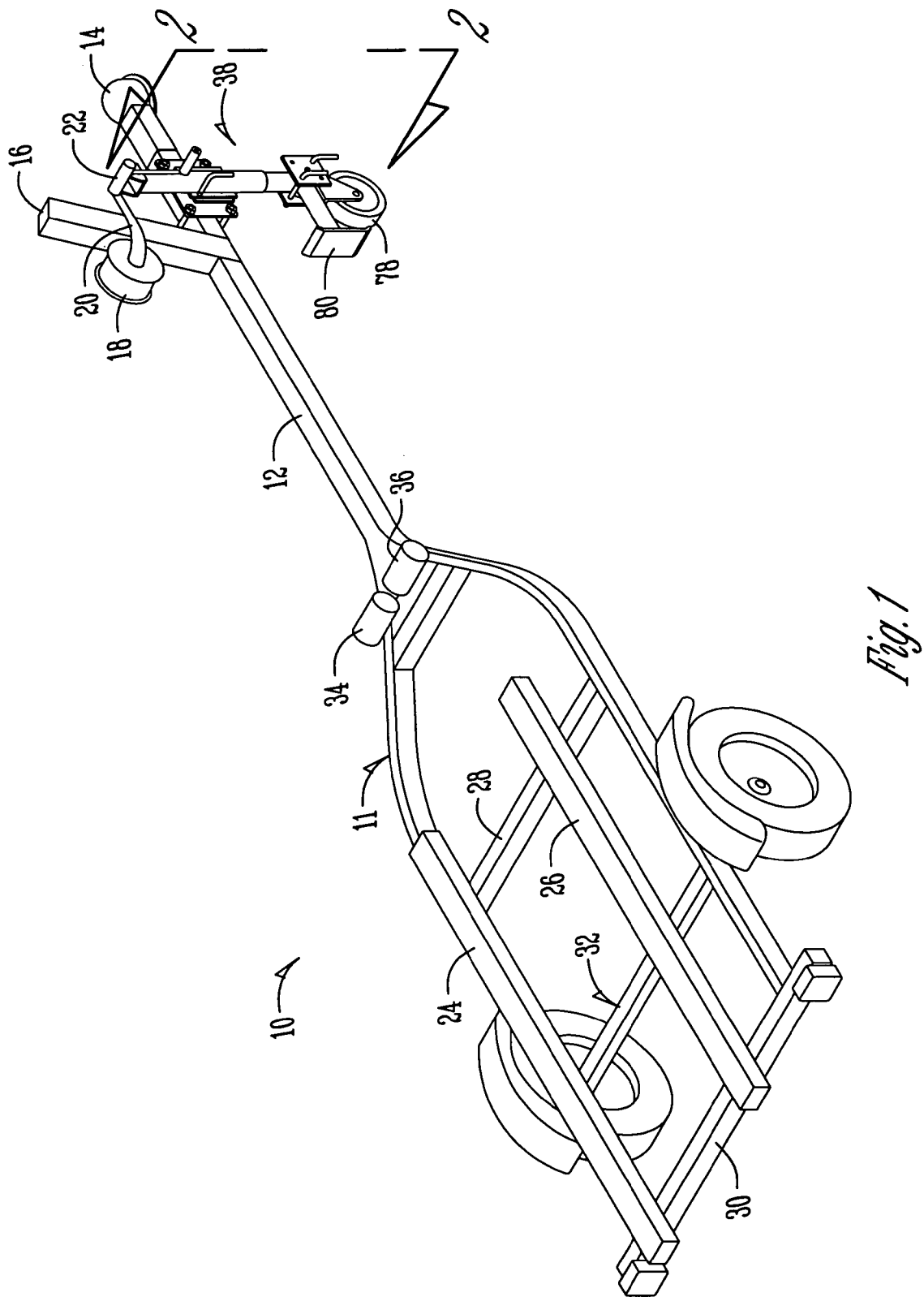
FIG. 1 is a perspective view of the boat trailer of the present invention.

For purposes of promoting and understanding of the principals of the invention reference will be made to the specific embodiment illustrated in the drawings and the specific language used in the specification to describe the same. It should nevertheless be understood that there is no limitation of the scope of the invention thereby intended and such alterations and further modifications in the illustrated device and such further applications of principals of the invention as illustrated therein would normally occur to one skilled in the art are encompassed by this description and the claims. Unless specifically otherwise defined, words are intended to mean their plain ordinary English language definitions.

Referring now to FIG. 1 particularly, one embodiment of a boat trailer of this invention, referred to generally as 10, is formed from a frame assembly 11 having a forward positioned tongue 12 and a hitch 14. Positioned midway on the tongue 12 is a winch post 16 which has mounted to it a rotatable spool 18, rotatable by turning arm 20 using handle 22. The frame assembly 11 has a pair of bank bars 24 and 26 mounted on it for support of the bottom of the boat, and a pair of keel supports 34 and 36 positioned at the rear end of tongue 12. Bank bars 24 and 26 are mounted on frame cross bars 28 and 30. The wheel and axle unit 32 is secured to the rear of the frame 11 for transport.

The improvement of the present invention lies particularly in the remaining portion of the structure, i.e., jack stand unit 38. The jack stand unit 38 is particularly shown in FIGS. 2, 3, 4 and 5. Other embodiments of a jack stand unit 38 are contemplated. Jack stand unit 38 comprises generally a first bracket 40 mounted to a forward position of the tongue section 12 which is generally just behind the hitch 14. Bracket 40 comprises a pair of U-shaped brackets 42 and 44 which are spaced apart and positioned around tongue 12 and bolted to a flat base 46 by nuts 48, 50, 52 and 54. Attached to base plate 46 is a plate 47 the construction of which is well-known. See, for example, one illustrative construction shown in U.S. Pat. No. 5,040,937 which is incorporated herein by reference for its detail of a rotatable jack stand unit. A first plate 47 has apertures (not shown) and mounted to it along a central axis via a bolt is a second but rotatable plate 62. A spring biased pin 64 may be aligned with and placed through aligned apertures in plates 60 and 62 to secure the jack stand 38 in, for example, a down or ground engaging position as illustrated in FIG. 5. And, jack stand pin 64 may be pulled and the jack stand 38 rotated 90° to align with tongue 12 with the pin 64 then released to align with two different holes to securely hold the jack stand 38 in transport position parallel to tongue 12.

Mounted via welding to plate 62 is annular jack stand encasement 65 of conventional construction and interior telescoping unit 66 moveable up and down by rotating jack stand crank 68.

Figure 2:
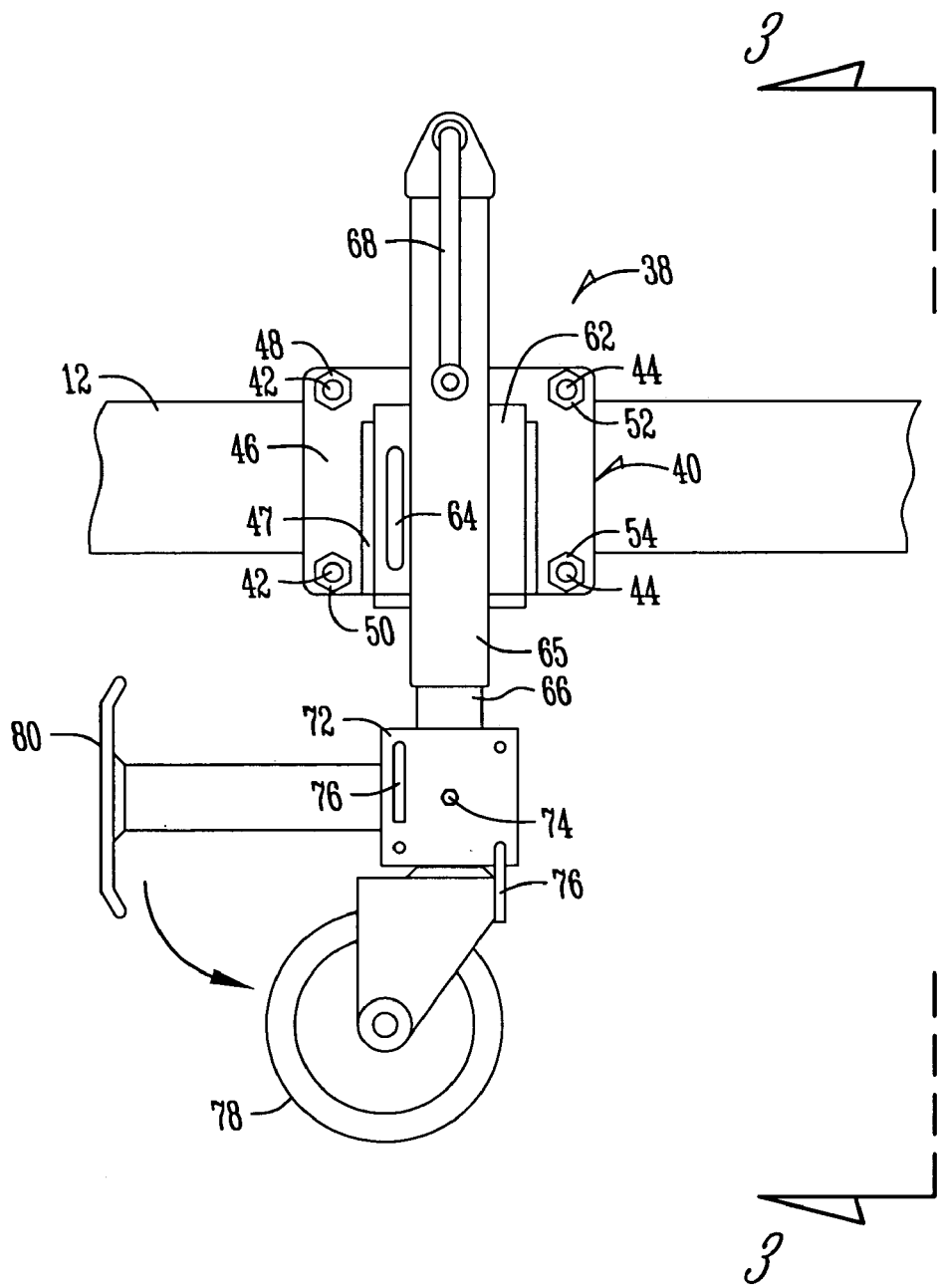
FIG. 2 is an enlarged side elevational view showing the jack stand assembly taken along line 2-2 of FIG. 1.
Figure 3:
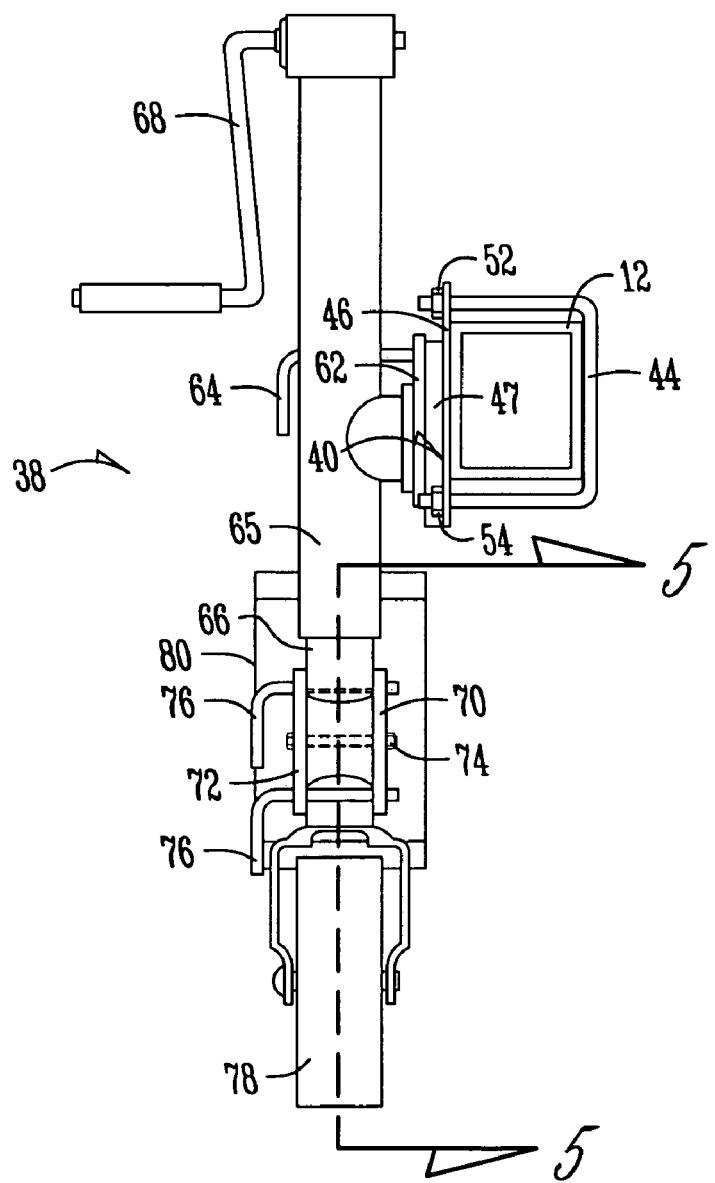
FIG. 3 is a view of the jack stand assembly taken along line 3-3 of FIG. 2.
Figure 4:
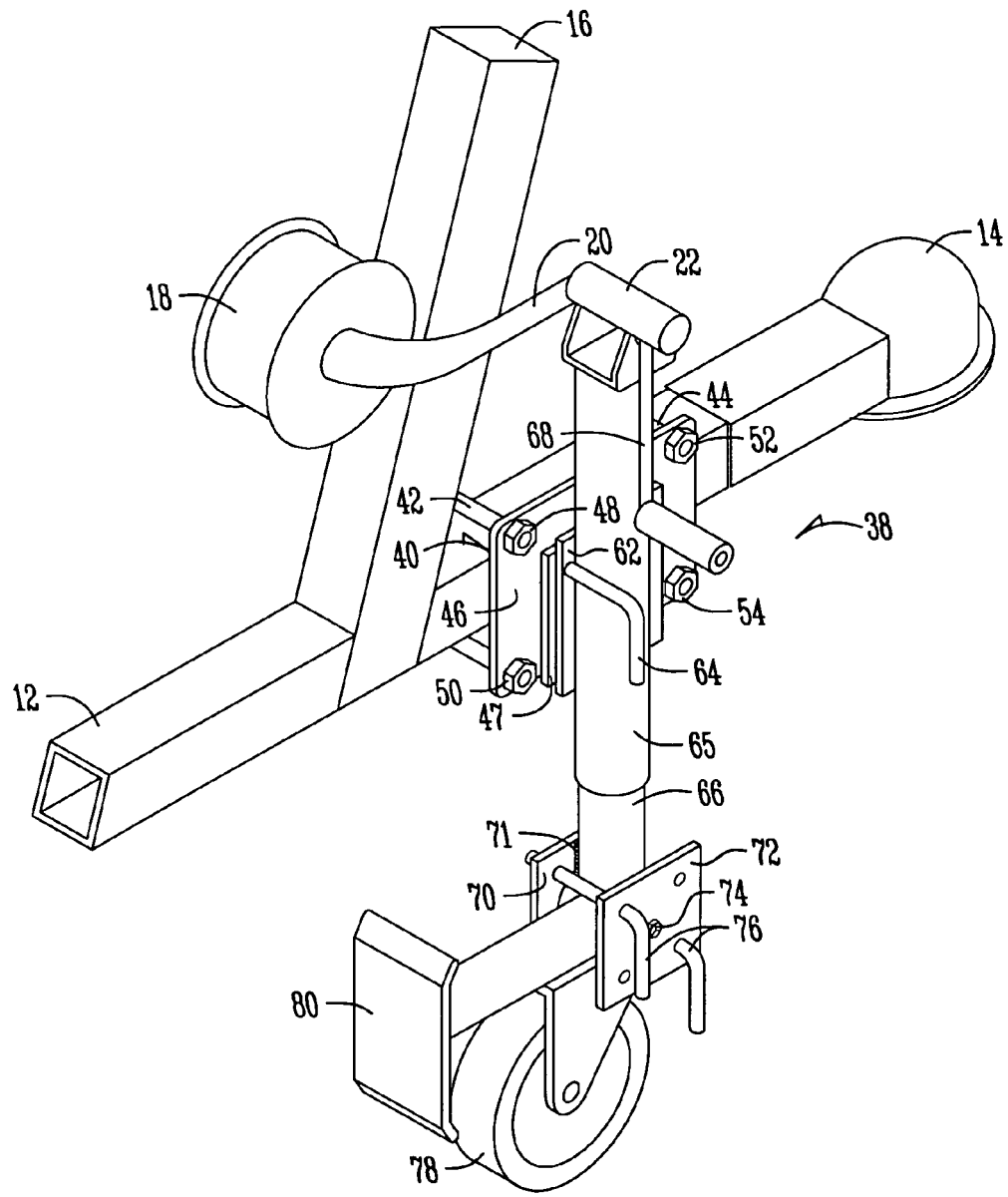
FIG. 4 is a fragmentary perspective view of the forward end of the torque section of the frame showing the winch and jack stand.
Figure 5:
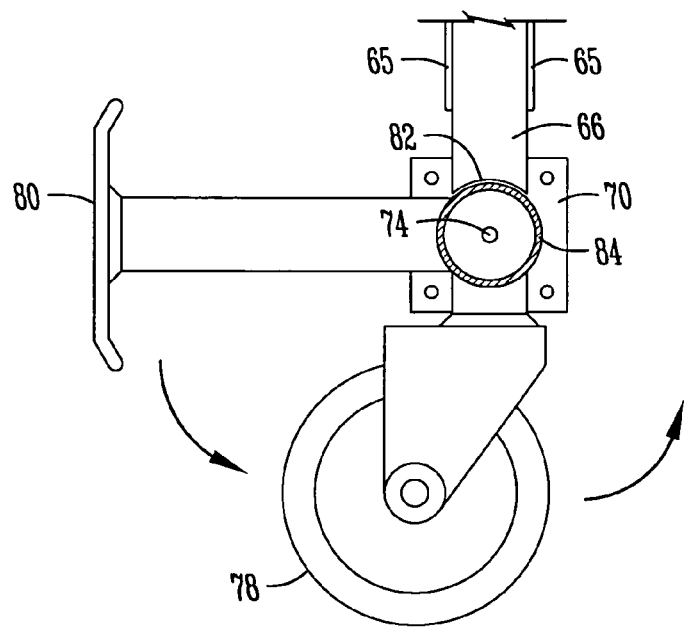
FIG. 5 is a view taken along line 5-5 of FIG. 3.

As best shown in FIGS. 2-4, there is a plate 70 attached to the side of the lower portion of the telescoping unit 66. The plate 70 is preferably attached to the telescoping unit 66 by weld 71. However, other methods can be used to hold the plate 70 to the lower portion of the telescoping unit 66. Located on the opposite side of the telescoping unit 66 is another plate 72 parallel to the plate 70. The plate 72 is not attached or welded to the telescoping unit 66. Rather, the plate 72 is attached to the roller wheel assembly 78, the foot pedestal assembly 80 and a pivoting barrel 84. The plate 72, the roller wheel assembly 78, the foot pedestal 80, and the pivoting barrel 84 all rotate around a pivot pin 74, with respect to the plate 70 and the telescoping unit 66.

Figure 6:
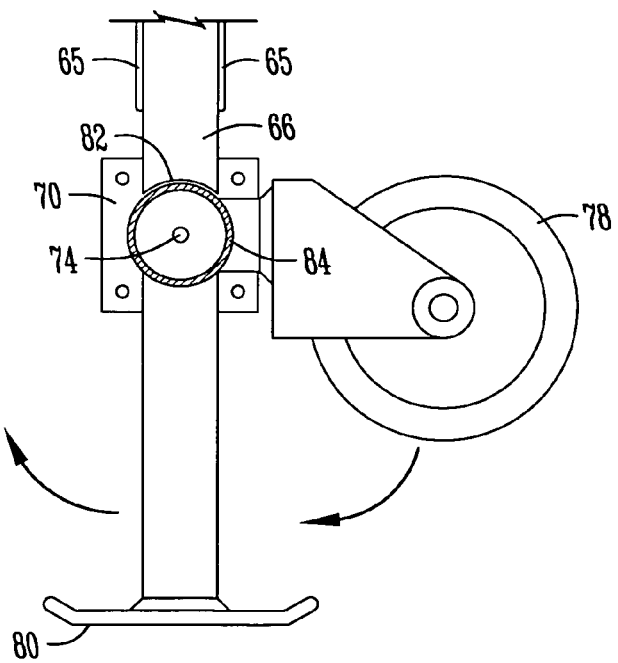
FIG. 6 is a view similar to FIG. 5, but with the pedestal rotated down.

Referring now to FIGS. 5 and 6, it can be seen that the pivoting barrel 84 pivots around the pivot pin 74 in relation to a concave knuckle joint 82. There should be a small amount of clearance between the concave knuckle joint 82 and the pivoting barrel 84 to allow rotation of the pivoting barrel 84, yet support under weight of a load. This allows selectively using either the roller wheel assembly 78 or the foot pedestal assembly 80 as the bottom portion of the jack stand 38 for engaging the ground.

Referring now back to FIGS. 2-4, two locking pins 76 can be seen passing through both the plate 70 and 72. These locking pins 76 are preferably passed through holes in plate 72 and are also preferably spring loaded to continually engage corresponding holes in plate 70. With the layout of the locking pins 76 and plate 70, the plate 72 and wheel assembly 78 and foot pedestal 80 can rotate about the pivot pin 74 and the locking pin 76 can engage corresponding holes in the plate 70. With multiple corresponding holes in the plate 70, the roller wheel assembly 78 and foot pedestal assembly 80 can be located and locked into multiple locations. With plates 70 and 72 located on each side of the telescoping unit 66, the jack stand assembly 38 has strength to hold heavy loads. Additionally, the pivoting barrel 84 engaging the concave knuckle joint 82 creates additional strength for the jack stand 38. It is understood, however, that different configurations can be used for creating an adjustable jack stand 38 which allows for selectively using either a roller wheel assembly 78 or a foot pedestal 80 to engage the ground on a trailer 10.

It therefore can be seen a unique combination of features of this boat trailer are the jack stand may be selectively rotated 90° to move from ground engaging position to a transport position in parallel alignment with tongue 12 (this part alone is conventional); but it also has an additional collar unit to allow the telescoping rod of the jack stand to also be rotatably changed and move from selective alignment with a roller wheel 78 in ground engaging position to a foot pedestal 80 in ground engaging position. In this manner, the unit can be selectively operated for movement with the roller wheel down 78 for movement or for secure non-rolling storage with the foot pedestal 80 down. There is therefore no need for locking units, no need for support blocks to hold the tongue parallel to the ground, and importantly, the entire unit may be selectively moved up and placed in a parallel to the tongue transport position while the trailer is used in a boat transport mode. Therefore, it can be seen that the invention accomplishes at least all of its stated objectives.

What is claimed is:

1. In a trailer having a frame with a tongue section and a hitch attached to the tongue section, the improvement comprising:
    a first bracket mounted on the tongue section;
    a jack stand mounted on said first bracket, said jack stand having a telescoping leg;
    a second bracket mounted on said telescoping leg; and
    a rotatably plate attached to said second bracket with a foot pedestal and a roller wheel each attached to said plate such that they can be selectively rotated into ground engaging position.

2. The trailer frame of claim 1 wherein said jack stand is rotatable mounted to allow movement from a down use position to an up transport position parallel to the tongue section.

3. The trailer frame of claim 2 which is a boat trailer.

4. The trailer frame of claim 2 wherein a said jack stand is mounted to a plate rotatable mounted to a second plate.

5. The trailer frame of claim 4 wherein said second plate has a spring biased pin which may be pulled, and aligned with holes in said first plate and released to lock said pin in a different selected position.

6. The trailer frame of claim 5 wherein said rotatable mounted plate may be rotated 90° and has a spring biased pin for biasing the pin to allow it to lock said plate into a different selected position.

* * * * *